Dec. 6, 1966  J. F. BENNETT ET AL  3,289,931
DISCOUNTED CASH FLOW RETURN RATE TEMPLATE
Filed Jan. 8, 1964  2 Sheets-Sheet 1

INVENTORS
JACK F. BENNETT
RALPH L. BROWN, JR.
ALFRED T. HERON
ROBERT E. LIENHARD
BY
ATTORNEY

Dec. 6, 1966   J. F. BENNETT ET AL   3,289,931
DISCOUNTED CASH FLOW RETURN RATE TEMPLATE
Filed Jan. 8, 1964   2 Sheets-Sheet 2

INVENTORS
JACK F. BENNETT
RALPH L. BROWN, JR.
ALFRED T. HERON
ROBERT E. LIENHARD
BY
ATTORNEY

United States Patent Office 3,289,931
Patented Dec. 6, 1966

3,289,931
DISCOUNTED CASH FLOW RETURN
RATE TEMPLATE
Jack F. Bennett, Riverside, Conn., Ralph L. Brown, Jr.,
New York, N.Y., Alfred T. Heron, Old Greenwich,
Conn., and Robert E. Lienhard, Coral Gables, Fla.,
assignors to Esso Research and Engineering Company,
a corporation of Delaware
Filed Jan. 8, 1964, Ser. No. 336,420
7 Claims. (Cl. 235—89)

This invention relates generally to devices used as aids in the solution of accounting problems and specifically to a series of related templates each representing by arrangements of scalar indicia, a predetermined cash flow ratio. Accordingly, problems of cash outflow in terms of investment and cash inflow in terms of return upon the investment may be solved graphically as a more efficient substitute for conventional mathematical solutions.

In accordance with the present invention, no mathematical calculation is required and cash flows for any number of years may be solved for investment projects. In a particular embodiment to which the invention is not necessarily to be limited, a set of templates is utilized, approximately 8½" wide by 11" long (letter size), which may be constructed of plastic or of stiff cardboard thick enough to maintain its stiffness under continuous usage. Each template (designed for cash flows up to 20 years) contains 21 slots running parallel to the short (8½") edge of the template. The slots are evenly spaced, approximately ⅜" on centers, and are ⅛" wide. The bottom of the slots, that is the bottom of the page as the numbers and indexes are read, are parallel to the long edge and exactly in line, i.e. all 1" from the long (11") edge of the template. The slots are clearly labeled at the bottom with numbers ranging from 0 to 20, the numbers referring to years (periods). On the edge of each slot is a graduated index ranging upward from 0 to 10 with intermediate decimal values marked as closely as space will permit. These index numbers are expressed in terms of the dollar amount of the cash inflows occurring in the year indicated at the bottom of the slot (i.e. 0–20). The index gradations on each slot on the template are in terms of dollar units, but the spacing of the index gradations is governed by the coefficients of the present value tables translated to linear measure. The rate at which the cash flow is to be discounted will be set separately for each template and there will be one template for each desired discount rate.

The total device thus consists of a complete set of templates, each one constructed for a different discount rate. To employ the device, the user draws a straight vertical line on a piece of paper and then marks off a line of length equal to and representing the initial dollar investment of the project under analysis, using the scale on the "year 0" slot of the template for the rate at which the user feels is close to the probable return rate. The slot for "year 1" is then aligned with the pencilled line and the "zero" point of the line and the "zero" point on the "year 1" scale lined up. The portion of the pencilled line representing the "year 1" cash inflow as measured on the "year 1" slot scale is then marked off on the pencilled line. The template is then moved to the left and the portion of the pencilled line representing the second year cash inflow as measured on the "year 2" slot scale is then marked off using the point marked for the previous year's cash flow as the "zero" point for the new portion. This process is repeated until there are no more cash flows to consider, using the slot scale appropriate to the year of each cash flow. Cash flows occurring after 20 years may be lumped into a residual and treated as a single inflow in year 20 as in the normal procedure for discounted cash flows return calculations.

At the conclusion of this process, the length of the accumulated discounted inflow lines is compared with the length of the investment line as measured on the "year 0" scale. If the two lengths are the same, the discount rate chosen is correct; if the inflow line is longer than the investment line, the discount rate chosen is not high enough; and if the inflow line is shorter than the investment line, the discount rate chosen is too large. Another template can then be chosen with a more appropriate discount rate, and the entire process repeated to ascertain the discount rate more accurately, with the process being repeated until the necessary precision is attained.

A variation of the device replaces the page size templates with a group of rulers or scales made of thin plastic. Each ruler is approximately 1" wide and 10" long and represents the discounted cash flow scale for years 0 through 20 or 30 or 50 at any discount rate. The index values printed on each ruler are in terms of dollar units but the spacing of the index gradations is governed by the coefficients of the present value translated to linear measure. The discount rate and year applying to each scale is clearly printed on the scale. For convenience all the yearly scales pertaining to any one discount rate may be fastened together by means of a chain through holes in one end of the scales or pivoted on a common swivel such as a feeler gauge. For computational purposes these scales are used in the same manner as those on the template.

In the following description, reference is made to particular examples which the invention is not necessarily to be limited, constructed in accordance with the principles of the invention wherein.

Figure 1:
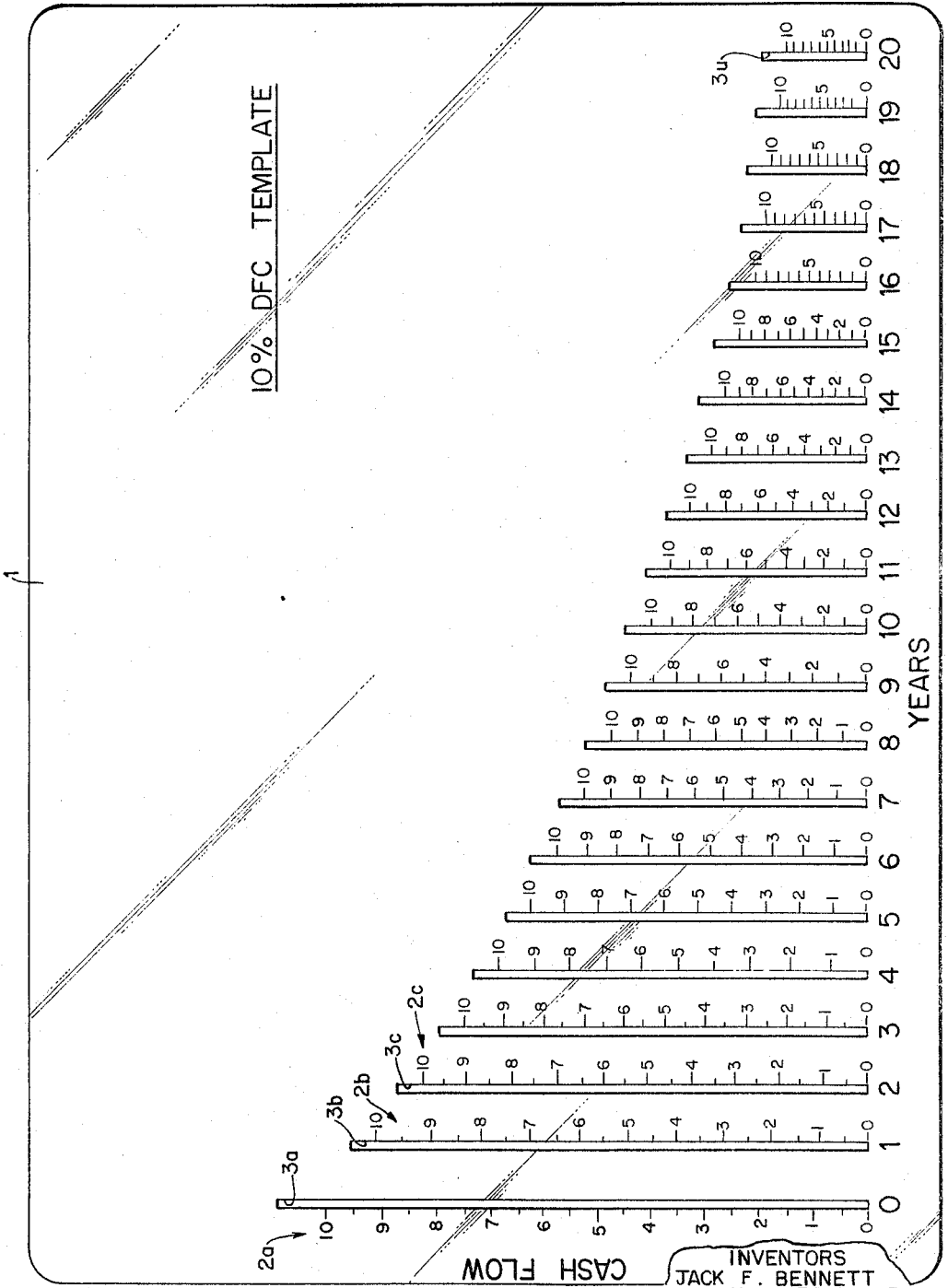
FIGURE 1 is a plan view of a single template which may be used in cooperation with others in a series representing different cash flow return rates.

In order to describe the device of the present invention let us postulate two types of problems requiring the use of discount tables to obtain a given discount cash flow (DCF) return rate. Solution of this type of problem depends on trial and error. No simple mathematical method has yet been devised which will permit finding the correct return rate for a variable cash inflow over a period of years by means of a single calculation. Use of the template, however, does eliminate the necessity of any calculations and thus, although the trial and error process is still necessary, the time required to arrive at the correct rate is much reduced. If accuracy greater than to the nearest 1% is desired, the regular discount tables can then be entered at nearly the correct point for the final calculations.

In the first example which follows, we have assumed two types of problems. The first is the simple case of an investment (cash outflow) in "year 0" followed by a stream of cash inflows in succeeding years. The second example envisions the case where the investment is spread out over the first five years with net cash inflows not beginning until the sixth year and continuing for some years thereafter.

EXAMPLE 1

| Year | 0 | 1 | 2 | 3 | 4 | 5 | 6 | 7 | 8 | 9 | 10 |
|---|---|---|---|---|---|---|---|---|---|---|---|
| Cash: | | | | | | | | | | | |
| Outflow | (650) | | | | | | | | | | |
| Inflow | 0 | 100 | 120 | 140 | 160 | 140 | 120 | 100 | 100 | 100 | 100 |
| Net Cash Flow | (650) | 100 | 120 | 140 | 160 | 140 | 120 | 100 | 100 | 100 | 100 |

By inspection one might choose a 10% rate as being close to the actual rate and so use the 10% template. (See FIGURE 1.) Each template 1 may be constructed as a sheet of clear plastic. Arranged thereupon in adjacent parallel relation is a series of scalar indicia, 2a, 2b, 2c, etc., each representing linearly and with respect to adjacent scales cash inflow or outflow at a given common discount cash flow ratio (percentage). The linear gradations of individual scales 2a, 2b, 2c, etc., for specific periods (years) will be constructed by reference to conventional Present Value or Discount Tables which are used normally for computing mathematical solutions to problems of the above type. The numerical values of the Discount Tables are converted to linear form by taking the coefficient of Present Value for a given percentage for each respective year (with 0–0 year representing unity and subsequent years progressively diminishing). A series of parallel slots 3a, 3b, 3c, etc., is provided in each template 1 intermediate the terminal indicia 0–0, 1–1, 2–2, designating the individual years of the given cash flow ratio.

Having chosen by inspection for trial the 10% rate, a straight line X—X is drawn upon a calculation sheet using a chosen percentage cash flow rate template 1. The direction is immaterial and may be drawn horizontally or vertically as convenient. Figure (a) shows such a line and marked on it two dots or ticks located by lining up the "year 0" slot on the template with the line and marking the zero point and the amount of the investment or cash outflow in "year 0" on the scale provided. In the above case it is 650. This figure of 650 can represent tens, hundreds, thousands, or millions of dollars.

*Figure (a)*

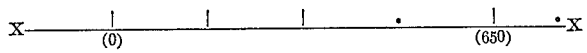

The segment of the line now marked off represents the present value of the investment.

In order to match the inflows with this outflow the template is next shifted so that the adjacent scale representing the cash flow ratio in the first year (1–1) is lined up with the line X—X and the zero point of 1–1 is lined up with the zero tick on the line X—X. Then the distance representing the first year cash inflow is marked along the line X—X from the zero tick, through the slotted opening 3b in the template. See Figure (b).

*Figure (b)*

First year inflow

Now the template is moved so that the "year 2–2" slot is in registry with the line X—X and the zero point on the scale is located over the terminal point of the previous line segment constructed from the 1–1 scale. In other words, each segment of a year taken from the scale corresponding to that year is added linearly to the previous year's segment. The second year cash inflow is then scaled off on the slot scale and marked. See Figure (c).

*Figure (c)*

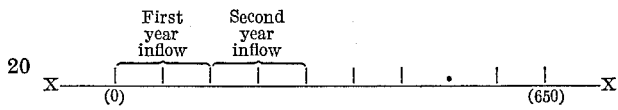

The above process is then continued until all of the cash inflows have been marked off along the line X—X. The cumulative total of these distances represents the present value of all the inflows discounted at 10%. (See Figure (d).) However, we are concerned and the closely the length of the investment segment and the cumulative inflow segments of the line match. In this case (see Figure (d)) it will be seen that the inflow total is bigger than the investment total and this tells us that too low a discount rate has been used. Consequently, a higher discount rate should be used, as represented by a related series of scalar indicia on a separate template (not shown) which will be similar in arrangement to the template 1, with different linear values for the scales 3a, 3b, 3c, etc.

*Figure (d)*

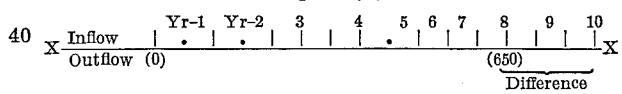

In order to find the accurate rate a higher value is chosen, for example, 12%, and using the template for this rate the process just described is used. The results are shown in Figure (e). Since the investment distance and the cumulative inflow distances exactly coincide, we know that 12% is the precise DCF return rate of the investment and its return as set forth in Example 1.

*Figure (e)*

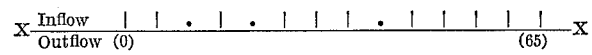

EXAMPLE 2

| Year | 0 | 1 | 2 | 3 | 4 | 5 | 6 | 7 | 8 | 9 | 10 |
|---|---|---|---|---|---|---|---|---|---|---|---|
| Cash: | | | | | | | | | | | |
| Outflow | (100) | (120) | (140) | (150) | (160) | (110) | 0 | 0 | 0 | 0 | 0 |
| Inflow | 0 | 0 | 20 | 30 | 40 | 60 | 120 | 180 | 250 | 265 | 280 |
| Net Cash Flow | (100) | (120) | (120) | (120) | (120) | (50) | 120 | 180 | 250 | 265 | 280 |

The procedure in this case is similar to the first example, the only difference being that the investment must also be expressed in terms of present value since it is spread over several future years. The usual line is drawn and some appropriate rate is chosen according to the best estimate as to the return rate. For the example 12% will be chosen initially. Using the slots and slot scales for the appropriate years we plot the net investments for the years in which they occur, in our example this is the first five years. This step is shown in Figure (f).

*Figure (f)*

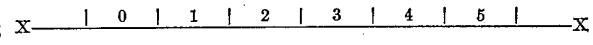

It is now suggested that a second line be drawn closely paralleling the first line and only the two marks defining the total length of the outflow line be transferred to the second line. This will prevent confusion over which dot or tick represents respectively outflow or inflow when the second set of inflow values are plotted. Now, commencing with the first inflow, being careful to use the slot for the correct year (year 6 in this case), the inflows are plotted in the manner described in Example 1. Figure (g) shows this step.

*Figure (g)*

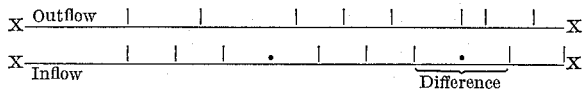

Again it is seen that the two lines or lengths of line, representing the present value of the inflows and outflows discounted at 12% do not coincide. This means that the choice of a discount rate was not accurate and since the inflow line is shorter than the outflow line the rate chosen was too high. Therefore the process is repeated using the 10% template and the lengths now coincide, showing that 10% is the actual return rate. (See Figure (h).)

*Figure (h)*

Any combination of inflows and outflows of varying amounts and in various years or periods can be handled in this manner so long as the user is careful to cumulate the outflows separately from the inflows.

Figure 2:
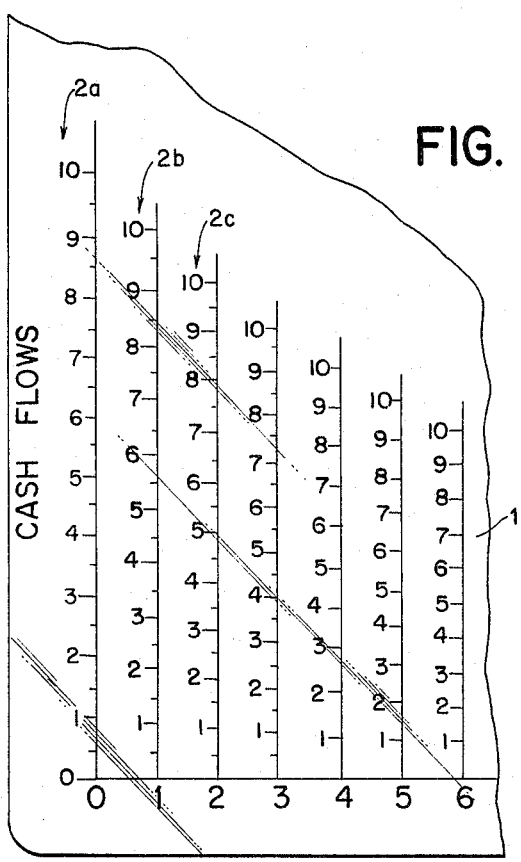
FIGURE 2 is a modified form of template shown in FIGURE 1.

According to the modification shown in FIGURE 2, each of the templates may be made with the same general scalar arrangement shown in connection with FIGURE 1, but lacking the several parallel slots 3a, 3b, 3c, etc. In this case a line similar to the line X—X of the example would be drawn immediately adjacent to the edge of a sample worksheet, and the edge of the worksheet would be then aligned with the several scales successively to construct the line segments in accordance with the previous description.

Figure 3:
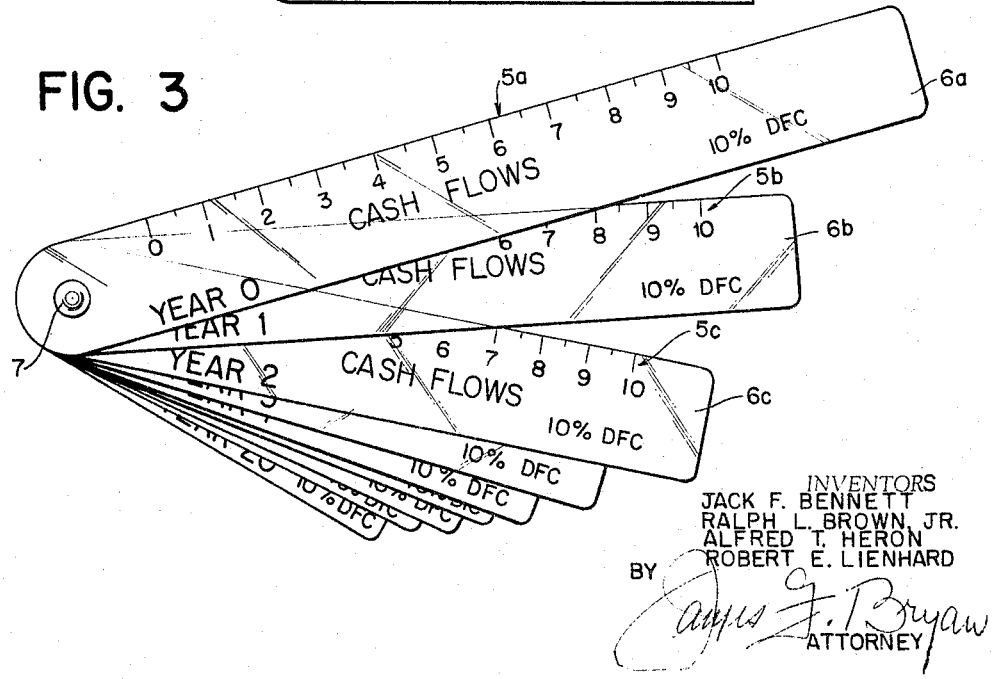
FIGURE 3 represents a different embodiment of the invention wherein a set of scalar indicia for a given percentage cash flow rate are arranged upon separate scales connected at their bases for pivotal movement with respect to each other.

FIGURE 3 illustrates yet another variation in accordance with the principles of the invention. In this embodiment, a series of scales 5a, 5b, 5c, etc, are arranged upon individual template strips 6a, 6b, 6c, etc. which are fastened at their bases by a pivot pin 7. The pin 7 permits individual strips 6a, 6b, 6c, etc. to be swung separately from the group so that the scale thereupon may be used in the manner previously described. Each of the strips 6a, 6b, 6c, etc. will have a common percentage relationship with respect to the next adjacent strip and collectively the strips represent successive years, for example, 0 through 20, of a given percentage such as 10%, cash flow ratio. Another separate set of strips may then contain a series of scales representing a different common percentage cash flow ratio.

It will be understood therefore that the foregoing description is merely representative and relates to particular embodiments. Certain departures therefrom may be made within the clear teachings of the invention and, consequently, in order to appreciate fully the spirit and scope of the invention reference should be made to the appended claims.

What is claimed is:

1. A device for calculating graphical solutions to problems involving cash outflow in terms of investment dollars and cash inflow dollars in terms of return on a given investment project, comprising template means, a plurality of scalar forms on said template means each linearly representing cash outflow and inflow at a predetermined compound fixed percentage discount with respect to each other for a predetermined period within a span measured from the initial year to a terminal date of said investment project, and scalar indicia proportionately marking fractional segments of said cash inflow and outflow dollars on each of said scalar forms at said predetermined fixed percentage of cash outflow in said initial year.

2. The device according to claim 1 in which said plurality of said scalar forms are arranged upon a single template representing a common percentage.

3. The device according to claim 2 in which said scalar forms are arranged on a template of clear plastic material as a parallel series beginning in numerical progression from an initial form representing the start of an investment project to a terminal form representing the end of said investment project, each of said scalar forms being further delineated by a slot defined by said template extending the length of each form.

4. The device according to claim 1 in which each of said scalar forms comprises a unitary strip, and means for pivotally securing the bases of said strips having a common discount cash flow rate.

5. A device for determining the individual or cumulative present value, at a predetermined compound discount rate, of one or more anticipated cash flows in any period or periods in the future comprising template means, a first scale on said template means having indicia linearly proportional to the present value of a sum of money; and a plurality of second scales on said template means, each of said second scales corresponding to a predetermined period of time subsequent to said first scale and including indicia corresponding to the indicia on said first scale, each of said second scales being foreshortened in length by an amount equal to the predetermined compound discount rate for its respective period of time subsequent to said first scale.

6. A device for determining the individual or cumulative present value, at a predetermined compound discount rate, of one or more anticipated cash flows in any period or periods in the future comprising template means having a plurality of straight edge parallel slots formed therein, a first scale on said template means adjacent a first of said slots having indicia linearly proportional to the present value of a sum of money; and a plurality of second scales on said template means, each of said second scales associated with the remainder of said slots and corresponding to a predetermined period of time subsequent to said first scale and including indicia corresponding to the indicia on said first scale, each of said second scales being foreshortened in length in progressively diminishing amounts by an amount equal to the predetermined compound discount rate for its respective period of time subsequent to said first scale.

7. The method of graphically determining the individual or cumulative present value, at a predetermined compound discount rate, of one or more cash flows in any period or periods in the future comprising constructing a first line proportional in length to the present value of an initially invested sum of money, and subtracting vectorially a plurality of second lines each corresponding in length to the anticipated cash flow in a period of time subsequent to said first present value length line from said first line, each of said second lines being constructed from scales foreshortened in length by an amount equal to the predetermined compound discount rate for its respective period of time subsequent to the scale employed for the construction of said first line.

References Cited by the Examiner

UNITED STATES PATENTS

| 745,314 | 12/1903 | Baxter | 235—89 |
| 907,716 | 12/1908 | Battershall | 33—111 X |
| 1,070,957 | 8/1913 | Hanby | 235—89 |

(Other references on following page)

UNITED STATES PATENTS

| | | | |
|---|---|---|---|
| 1,155,059 | 9/1915 | Heathcote | 33—104 |
| 1,248,905 | 12/1917 | Pestel | 235—89 X |
| 1,497,492 | 6/1924 | Engel | 33—114 X |
| 1,538,250 | 5/1925 | Love | 235—89 |
| 1,744,411 | 1/1930 | Ordway | 33—111 |
| 2,554,449 | 5/1951 | Shipps | 33—107 X |

OTHER REFERENCES

Mechanical Engineers Handbook, Theodore Baumeister, editor, Lional S. Marks, editor, 1916 to 1951, sixth edition, McGraw-Hill Book Co., 1958, pages 2–92 and 93 relied upon. TJ, 151, M 37, 1958, C. 3.

RICHARD B. WILKINSON, *Primary Examiner.*

LEO SMILOW, C. G. COVELL, JAMES G. MURRAY, *Assistant Examiners.*